US012617324B2

(12) United States Patent
Madhu et al.

(10) Patent No.: US 12,617,324 B2
(45) Date of Patent: May 5, 2026

(54) AUTO RETURN HEADREST FOR SEAT ASSEMBLY

(71) Applicant: Lear Corporation, Southfield, MI (US)

(72) Inventors: Adarsha B. Madhu, Novi, MI (US); Dnyaneshwari Daphal, Pune (IN); Digvijay Patil, Pune (IN); Stephen Redwood, Flat Rock, MI (US); Gopal Kalburgi, Pune (IN); Prafullakumar Gavali, Pune (IN)

(73) Assignee: LEAR CORPORATION, Southfield, MI (US)

( * ) Notice: Subject to any disclaimer, the term of this patent is extended or adjusted under 35 U.S.C. 154(b) by 197 days.

(21) Appl. No.: 18/651,607

(22) Filed: Apr. 30, 2024

(65) Prior Publication Data

US 2024/0367567 A1    Nov. 7, 2024

(30) Foreign Application Priority Data

May 5, 2023    (IN) .............................. 202341031999

(51) Int. Cl.
| | |
|---|---|
| *B60N 2/874* | (2018.01) |
| *B60N 2/30* | (2006.01) |
| *B60N 2/856* | (2018.01) |
| *B60N 2/859* | (2018.01) |
| *F16H 37/12* | (2006.01) |

(52) U.S. Cl.
CPC ........... *B60N 2/874* (2018.02); *B60N 2/3009* (2013.01); *B60N 2/856* (2018.02); *B60N 2/859* (2018.02); *F16H 37/122* (2013.01)

(58) Field of Classification Search
CPC ........ B60N 2/856; B60N 2/859; B60N 2/874; B60N 2/876
See application file for complete search history.

(56) References Cited

U.S. PATENT DOCUMENTS

| | | | | | |
|---|---|---|---|---|---|
| 5,681,079 | A | * | 10/1997 | Robinson ................. | B60N 2/36 |
| | | | | | 297/378.12 |
| 7,108,306 | B2 | * | 9/2006 | Suda .................... | B60N 2/3075 |
| | | | | | 296/65.09 |

(Continued)

FOREIGN PATENT DOCUMENTS

| | | | | |
|---|---|---|---|---|
| DE | 10220027 | C1 | 7/2003 | |
| DE | 202005008494 | U1 * | 8/2005 | ........... B60N 2/3011 |

(Continued)

*Primary Examiner* — Joshua J Michener
*Assistant Examiner* — Michael B. Kreiner
(74) *Attorney, Agent, or Firm* — ALSTON & BIRD LLP

(57)    ABSTRACT

An assembly comprises a seat bottom and a seat back pivotally attached to the seat bottom. The seat back is pivotal between a fold-forward position and an in-use position. A headrest is pivotally attached to the seat back by a tilt mechanism and is pivotal between a folded position and an upright position via the tilt mechanism. The tilt mechanism pivots the headrest forward to the folded position in response to the seat back being pivoted to the fold-forward position. A headrest-return mechanism is operably coupled to the seat back and to the headrest, wherein the headrest-return mechanism actuates the headrest such that the headrest is pivoted from the folded position to the upright position in response to the seat back being pivoted from the fold-forward position to the in-use position.

19 Claims, 6 Drawing Sheets

(56)     References Cited

U.S. PATENT DOCUMENTS

| | | | | |
|---|---|---|---|---|
| 7,258,400 B2 * | 8/2007 | Yamada | ................ | B60N 2/3011 |
| | | | | 297/378.12 |
| 7,478,860 B2 * | 1/2009 | Lawall | ................ | B60N 2/3011 |
| | | | | 296/65.01 |
| 7,575,282 B2 * | 8/2009 | Sutter, Jr. | ............... | B60N 2/876 |
| | | | | 297/403 |
| 7,901,007 B2 * | 3/2011 | Lindsay | ............... | B60N 2/0252 |
| | | | | 297/391 |
| 8,449,036 B2 * | 5/2013 | Jeong | .................... | B60N 2/809 |
| | | | | 297/408 |
| 8,579,368 B2 * | 11/2013 | Kokubo | ................ | B60N 2/859 |
| | | | | 297/316 |
| 8,662,578 B2 * | 3/2014 | Szybisty | ................. | B60N 2/36 |
| | | | | 297/378.12 |
| 9,216,671 B2 * | 12/2015 | Watanabe | .............. | B60N 2/304 |
| 10,406,956 B2 * | 9/2019 | White | ................... | B60N 2/3075 |
| 10,427,572 B2 * | 10/2019 | Jeong | .................... | B60N 2/844 |
| 11,124,100 B1 * | 9/2021 | Kangane | ............... | B60N 2/879 |
| 11,148,569 B2 * | 10/2021 | Xu | ......................... | B60N 2/847 |
| 11,208,019 B2 * | 12/2021 | Jiang | ...................... | B60N 2/20 |
| 2012/0326480 A1 * | 12/2012 | Misawa | ................ | B60N 2/847 |
| | | | | 297/391 |
| 2018/0326882 A1 * | 11/2018 | Bach | ..................... | B60N 2/844 |

FOREIGN PATENT DOCUMENTS

| | | | | | |
|---|---|---|---|---|---|
| DE | 102005015167 B4 * | 7/2011 | ............ | B60N 2/309 |
| FR | 2963907 A1 | 2/2012 | | |
| KR | 102402988 B1 * | 5/2022 | ............ | B60N 2/304 |
| KR | 20230167527 A * | 12/2023 | ............ | B60N 2/841 |

* cited by examiner

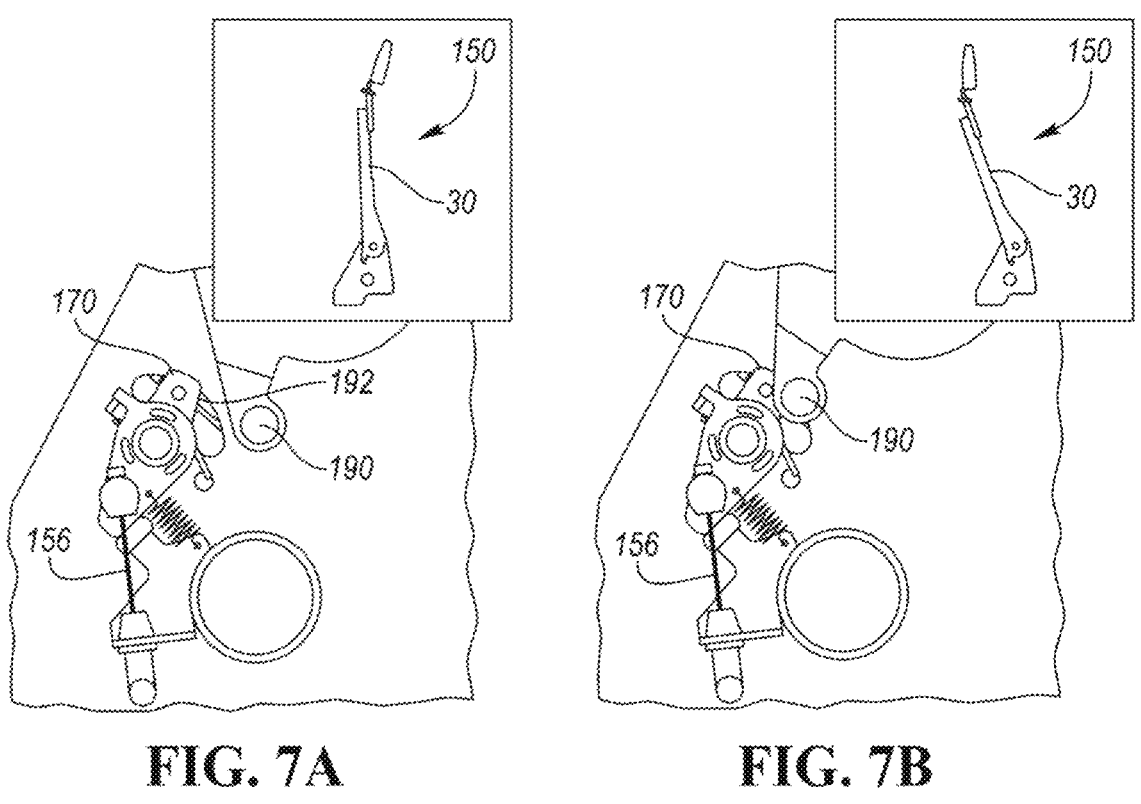
FIG. 7A
FIG. 7B
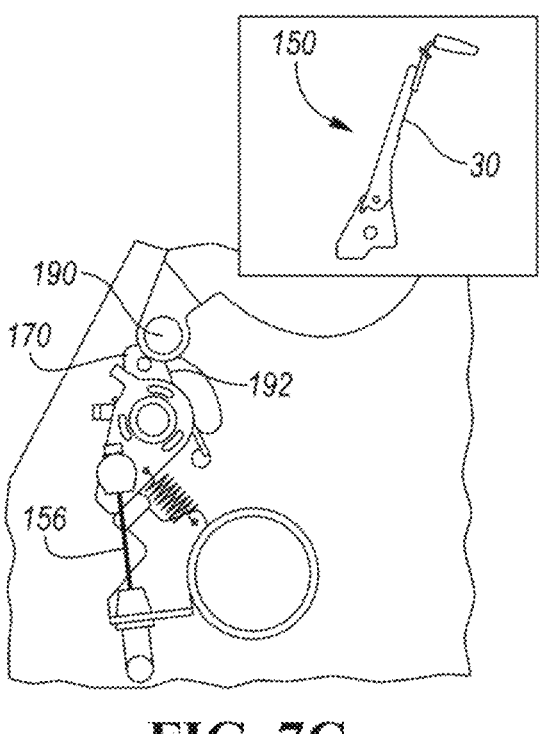
FIG. 7C
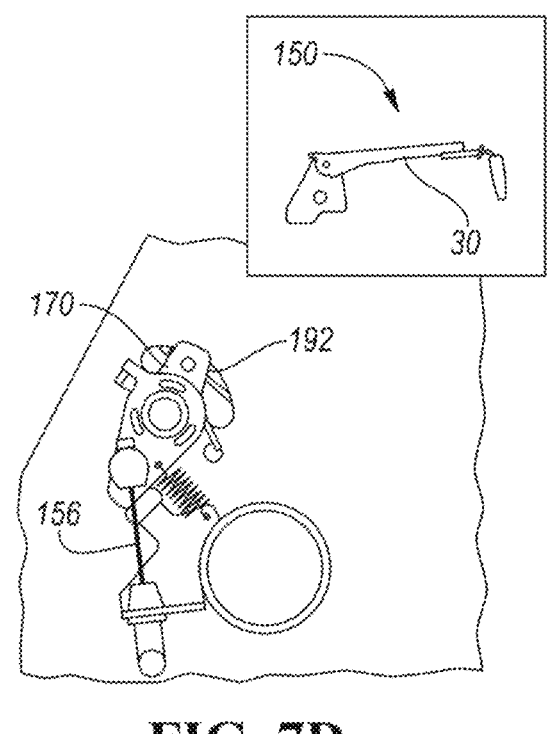
FIG. 7D

AUTO RETURN HEADREST FOR SEAT ASSEMBLY

CROSS-REFERENCE TO RELATED APPLICATIONS

This application claims foreign priority benefits under 35 U.S.C. § 119(a)-(d) to IN application No. 202341031999 filed May 5, 2023, which is incorporated by reference in its entirety.

TECHNICAL FIELD

This application relates to seats having a pivoting headrest that is automatically returned to an in-use position when a seat back is returned to an in-use position.

BRIEF DESCRIPTION OF THE DRAWINGS

FIGS. 7A-7D illustrate a sequence of the another seat assembly being moved to a stowed position.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first member could be termed a second member, and, similarly, a second member could be termed a first member, without departing from the scope of the various described embodiments. The first member and the second member are both member, but they are not the same member.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figures 1, 2:
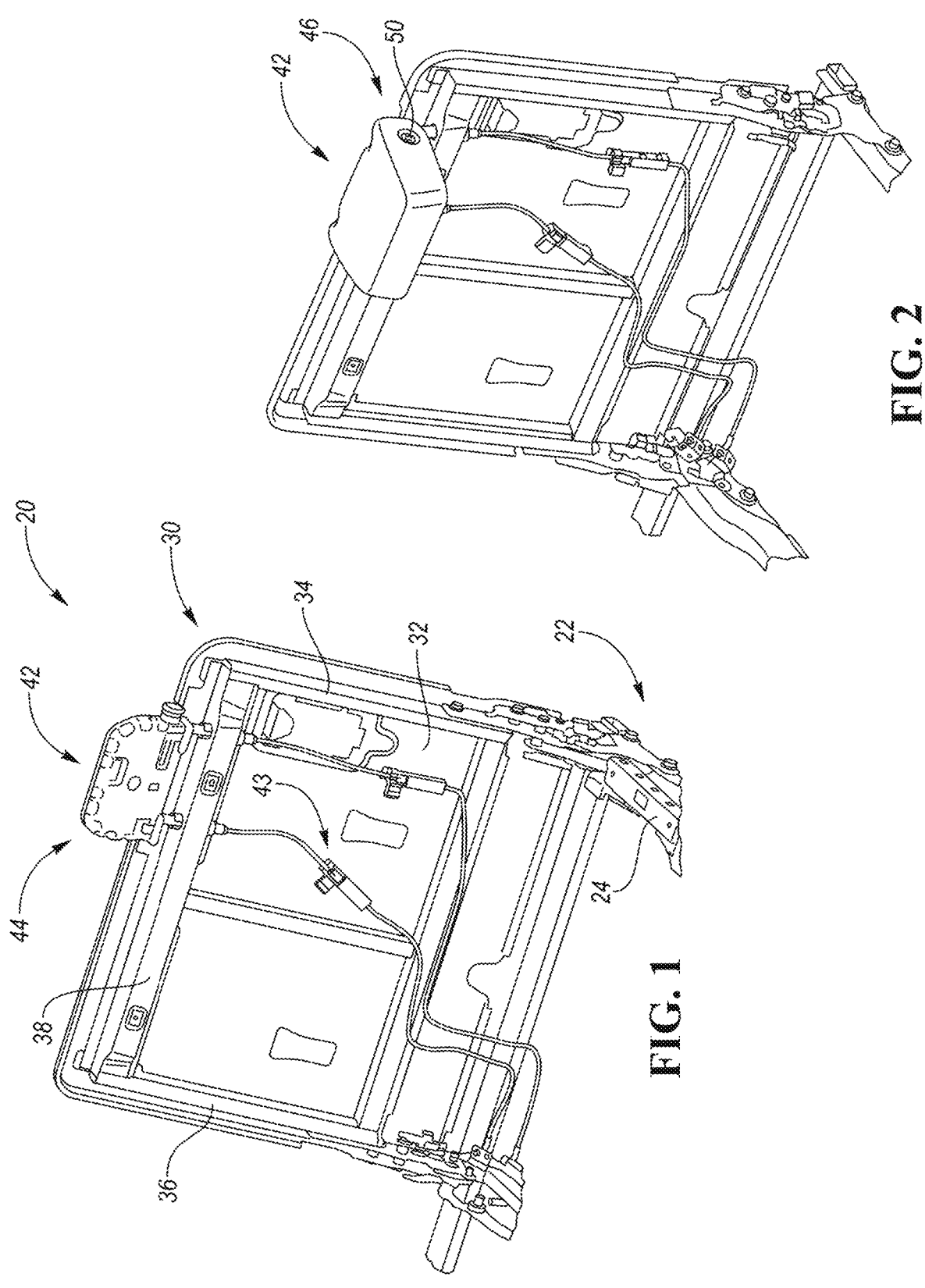
FIG. 1 is a perspective view of a seat assembly with a headrest in an upright position.
FIG. 2 is a perspective view of the seat assembly with the headrest in a forward folded position.

FIGS. 1 and 2 illustrate a seat assembly 20 according to an embodiment. The seat assembly 20 is illustrated as a vehicle seat assembly 20 for seating an occupant in a land vehicle, an aircraft, a watercraft, or the like. Any seat assembly 20, such as an office chair or a lounge chair may be employed, according to other embodiments. The seat assembly 20 may be a second-row seat or third-row seat of a vehicle. The seat assembly 20 may include one or more seating positions. For the depicted embodiment, the vehicle seat assembly 20 includes a seat bottom 22 for seating an occupant. The seat bottom 22 includes a frame 24 for supporting a cushion (not shown). The frame 24 may be supported upon rails for adjustment of a seating position of the seat assembly 20 or directly mounted on a substrate such as a floor, e.g., a vehicle floor.

A seat back assembly 30 extends in a generally upright direction from the seat bottom 22. The seat back assembly 30 includes a frame 32 with one or more side members, e.g., members 34, 36 and an upper cross member 38. The frame 32 may be formed from stamped steel, welded steel, or any suitable structural material. The seat back assembly 30 also includes a foam cushion (not shown) over the frame 32 and a trim cover (not shown). The seat back assembly 30 supports a back of an occupant. The frame 32 provides rigid support, and the foam 40 provides compliant support and flexible comfort to the occupant.

A headrest 42 is supported upon the upper cross member 38 of the seat back frame 32 to support a head of the seated occupant. The seat back assembly 30 includes a central region for supporting the back of the occupant. The seat back assembly 30 may also include a suspension extending across the side members 34, 36 to provide compliant support to the occupant.

The headrest 42 is pivotally attached to the seat back 30 to move between an upright position (in-use position) 44 and a folded or tilted position (non-use position) 46 in which the headrest is tilted forward relative to the seat back 30. The headrest 42 includes a tilt mechanism 48 (see, e.g., FIG. 3) that allows for pivoting of the headrest 42. The tilt mechanism 48 may include a button 50 (or similar mechanism)

allowing a user to manually adjust the forward pivot or tilt of the headrest 42 relative to the seat back 30. In addition to manual tilting of the headrest 42, the headrest 42 may automatically pivot towards the folded position or the upright position responsive to pivoting of the seat back 30. This will be explained in more detail below.

Figure 3:
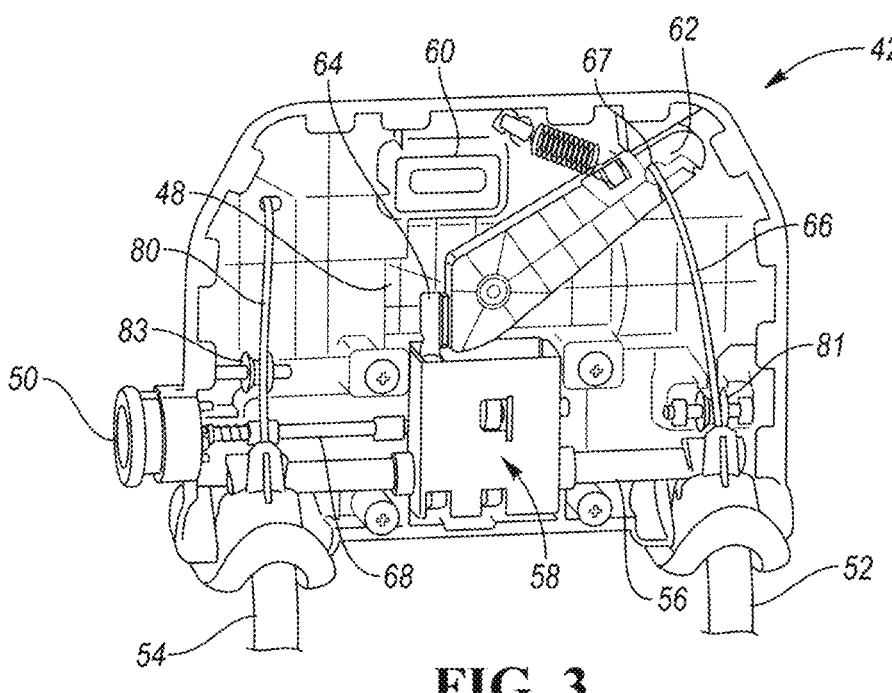
FIG. 3 is a back perspective view of the headrest partially deconstructed for illustrative purposes.

Referring to FIG. 3, the headrest 42 may be supported by a pair of posts 52, 54 attached to the seat back, such as the upper cross member 38. The shaft 56 extends between the posts. The headrest 42 is configured to pivot about the shaft 56, which is fixed relative to the posts 52, 54. The tilt mechanism 48 may include an actuator assembly 58 that enables the headrest 42 to pivot about the shaft 56. The actuator assembly 58 is connected between the frame 60 of the headrest and the shaft 56. The actuator assembly 58 may include one or more levers and cams that are configured to allow pivoting of the headrest 42 when in one or more first positions and to lock the headrest 42 when in one or more second positions. The tilt mechanism 48 may include a lever 62 that is pivotable relative to the frame 60 to engage a cam 64 associated with the actuator assembly 58. Pivoting the lever 62 downwards (when viewed from the orientation of FIG. 3) actuates the cam 64 to release the actuator assembly 58 and allow or cause tilting of the headrest 42. A spring (or the like) may bias the headrest to tilt responsive to release of the assembly 58. The button 50 is connected to the actuator assembly 58 via shaft 68 and is configured to release the actuator assembly 58 for manual tilting.

Figures 4A, 4B, 4C:
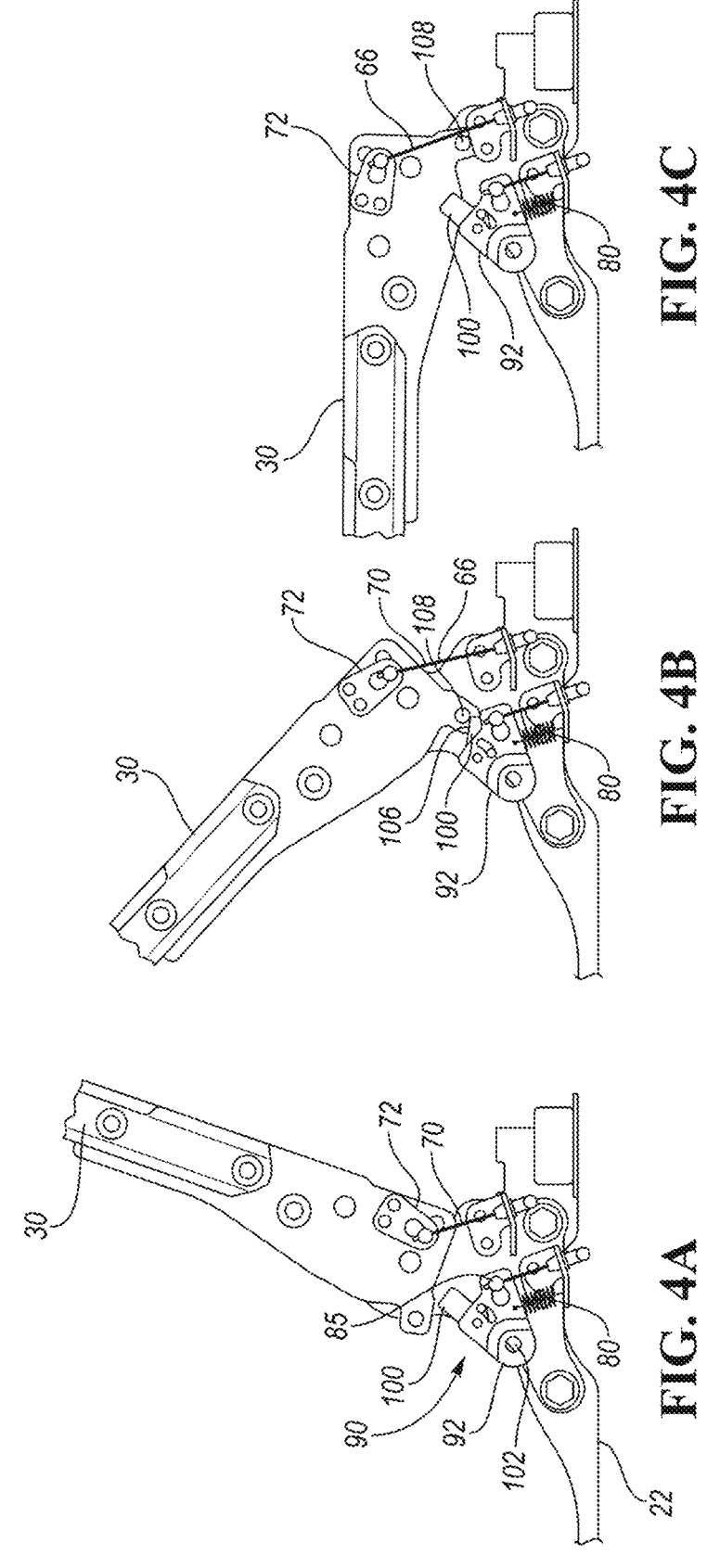
FIGS. 4A-4E illustrate a sequence of the seat assembly being moved to a stowed position and back to an in-use position.

Referring to FIGS. 3 and 4A, the lever 62 may be driven by a cable 66. The cable 66 includes a first end 67 connected to the lever 62 and a second end 70 attached to a cable pull 72. The cable pull 72 may be mounted to the frame 32 of the seat back 30 or other support structure. The cable 66 may be referred to as a tilt cable, which is configured to automatically tilt the headrest 42 forward in response to the seat back 30 being pivoted forward. The cable 66 includes a compensator 43 configured to provide slack for manual operation of the headrest 42 via the button 50. While not explicitly discussed, it is to be understood that the other cables, e.g., 80, may also include a compensator. As will be explained in more detail below, a second cable 80, which may be referred to as the return cable, is configured to automatically return the headrest 42 to the upright position in response to the seat back 30 being pivoted upwardly. The cables 66, 80 may be supported by roller assemblies 81 and 83.

Referring to FIGS. 4A-4E, the seat back 30 is pivotally attached to the seat bottom 22. For example, the seat assembly 20 may include one or more recline mechanisms (not shown) that allow pivoting of the seat back 30 relative to the seat bottom 22. The seat back 30 may default to an upright position (shown in FIG. 4A). The recline mechanism(s) may enable the seat back 32 to tilt backwards from the upright position between one or more reclined positions (not shown) and to pivot forward to a stowed (fold-forward) position (shown in FIG. 4C). The upright position as well as the one or more reclined positions may be referred to as "in-use positions" and the fold-forward position be referred to as a "non-use position."

The seat assembly 20 may be configured to automatically tilt the headrest 42 to the folded position 46 in response to the seat back 30 being pivoted forward towards the stowed position. As can be seen in comparing FIGS. 4A and 4B, forward pivoting of the seat back 30 pulls the cable 66, which pivots the lever 62, to release the actuator assembly 58 causing forward pivoting of the headrest 42.

The seat assembly 20 may be configured to automatically return the headrest 42 to the upright position 44. As can be seen in comparing FIGS. 4D and 4E, the second cable 80 is pulled as the seat back 30 moves from the stowed position towards the upright position. The pulling or tensioning of the second cable 80 causes the headrest frame 60 to pivot about the shaft 56 to return the headrest 42 to the upright position.

The cable 80 may be attached to the seat bottom 22 or other support structure by an automatic-return mechanism 90. The mechanism 90 may be operably coupled to the seat bottom 22, the seat back 30, and/or to the tilt mechanism 48. For example, the mechanism 90 may have one or more components attached to the frame 24, one or more components engageable with a component that rotates in unison with the seat back 30, and one or more components coupled to the headrest 42 via the cable 80.

The automatic-return mechanism 90 may include a cable-pull cam 92 connected to the cable 80 and pivotally supported about a pivot axis 94. For example, the cable 80 may include an end 85 that is received within a connector 83, e.g., an opening of the cam 92. The pivot axis 94 may be formed by a pin, bolt, shaft, or the like (not shown). The cam 92 may define a hole 96 that is received on the pin, bolt, shaft or the like. The cam 92 is stationary relative to the seat back 30 or, alternatively, moves independently of the seat back 30.

A pawl 100 is pivotably attached to the cam 92. For example, a pin or bolt 102 may be used to pivotally attached to pawl 100 to the cam 92. The pawl 100 may include a projection 110 that is received within and arcuate slot 112 of the cam 92. This limits the rotational range of the pawl 100 relative to the cam 92. The pawl 100 and/or the cam 92 may be biased to the position shown in FIG. 4A by springs or the like. The pawl 100 is configured to engage with a pin 108 that is either attached to the seat back 30 or is configured to rotate in unison with the seat back 30.

The seat assembly 20 may be placed in the stowed position by folding the seat back 30 forward and over the seat bottom 22. As shown in FIG. 4B, the cable 66 is tensioned when the seat back 30 pivots forwardly to tilt the headrest to the folded position. During the sequence, the cable 80 is not actuated. Instead, the pawl 100 pivots relative to the cam 92 in the clockwise direction when the pin 108 the contacts the first surface 106 of the pawl 100. The pawl 100 rebounds back to the resting position once the pin 108 passes over the pawl 100 as best shown in FIG. 4C. A spring may cause the rebound.

Figures 4D, 4E, 5:
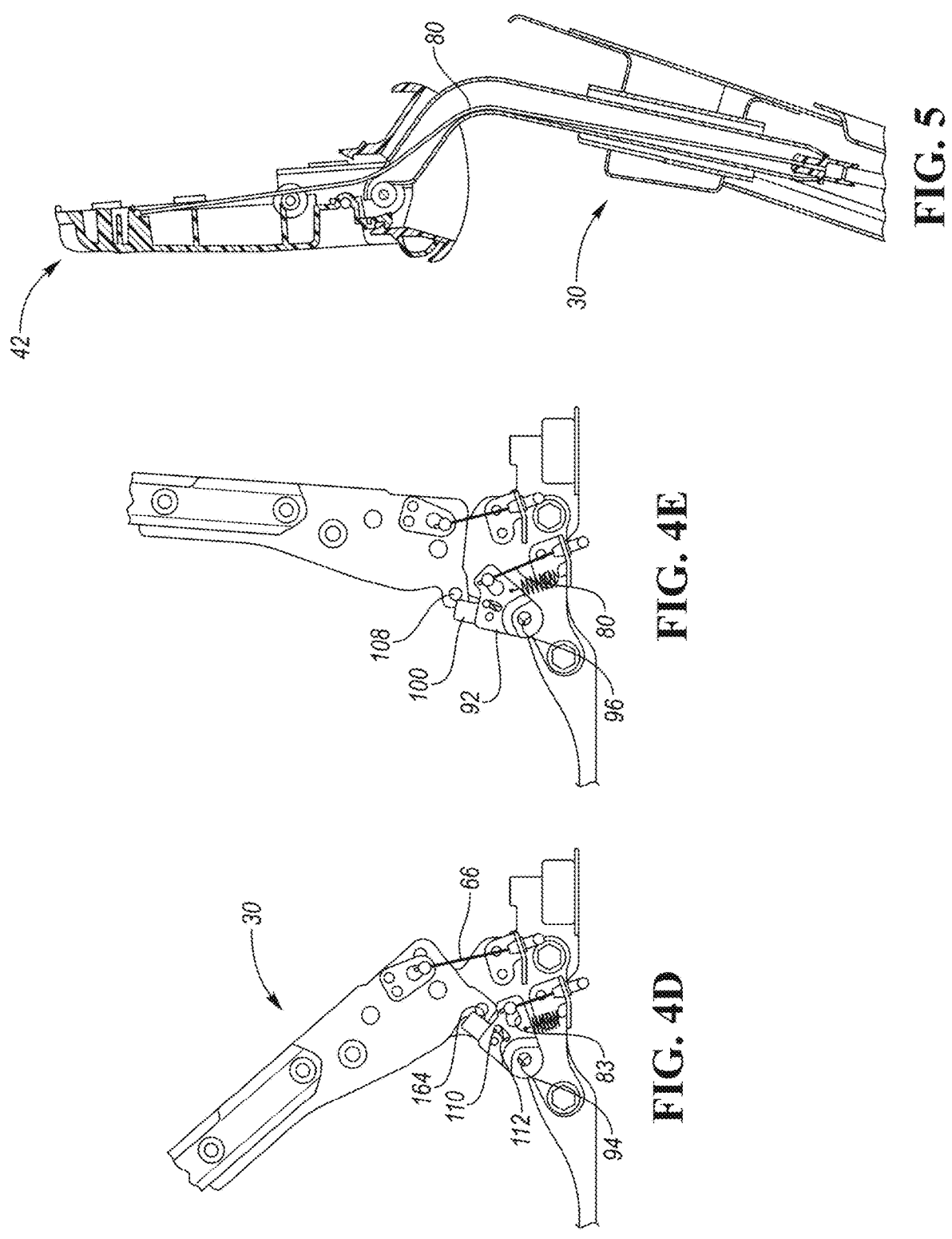
FIG. 5 is a side cross-sectional view of the headrest and seat back of the seat assembly.

As shown in FIGS. 4D and 4E, the second surface 104 of the pawl 100 engages with the pin 108 when the seat back 30 is pivoted towards the upright position. This time, the pawl 100 remains fixed relative to the cam 92, i.e., the projection 110 is at the end of the slot 112. As such, any movement of the seat back 30 drives the cam 92 to rotate about the pivot axis 94 thus tensioning the cable 80. The pulling of the cable 80 results in the automatic pivoting of the headrest 42 back to the upright position as shown in FIG. 5.

The above-described seat assembly 20 included separate mechanisms for holding the headrest down when moving towards the stowed position and returning the headrest upright when moving from the stowed position to an in-use position. In an alternative embodiment, the seat assembly 150 combines the automatic forward tilting of the headrest and the return in a single assembly. The seat assembly 150 includes many components, with the seat assembly 20 and these components will not be discussed again for brevity.

Figure 6:
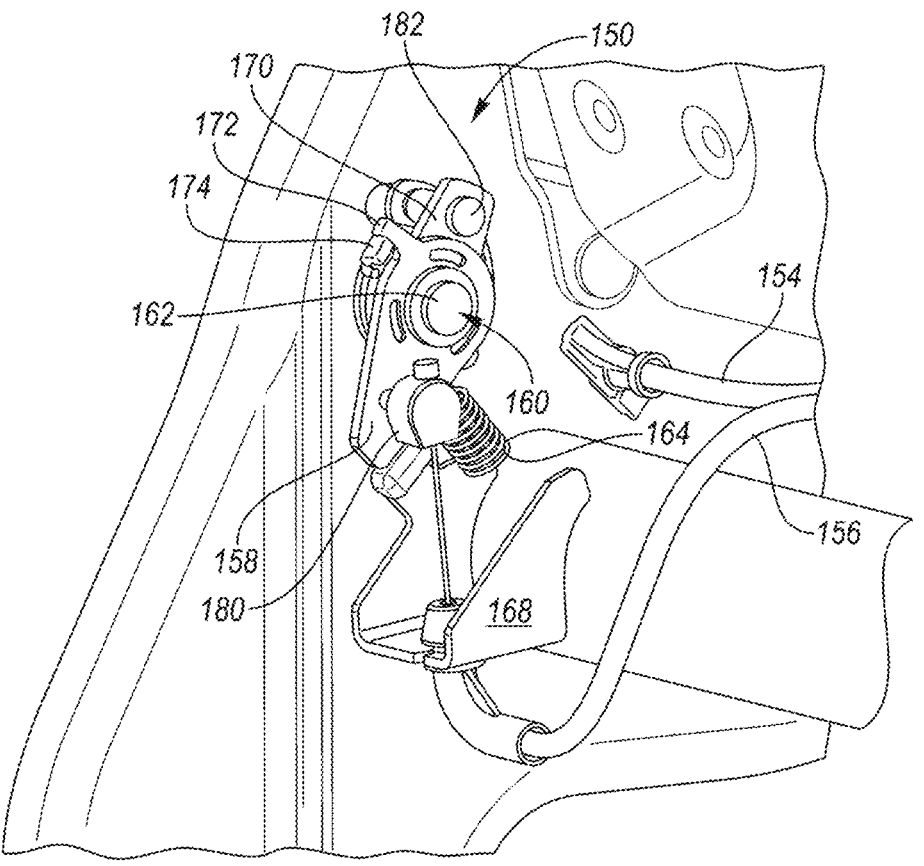
FIG. 6 is a perspective view of a headrest-actuator assembly of another seat assembly.

Referring to FIG. 6, the seat assembly 150 includes a headrest-actuation assembly 152 that is coupled to the headrest by a pair of cables 154 and 156. The cable 154 is similar to the cable 66 and is used to tilt the headrest forward. The cable 156 is similar to the cable 80 and is used to return the headrest the upright position. The assembly 152 includes a cam plate 158 that is pivotally supported about its pivot axis 160. Axis 160 may be formed by a pin 162 mounted to the frame of the seat assembly 150 or other stationary support structure. The cam 158 may be biased counterclockwise to the position shown in FIG. 6 by the spring 164. A stopper bracket 168 is configured to engage with the cam plate 158 to limit rotation in the counterclockwise direction. The pawl 170 is pivotally attached to the cam plate 158 and supported for pivoting about the axis 160. The pawl 170 may include a tab 174 that engages with a finger 172 of the cam plate 158 to limit movement of the pawl 170 relative to the cam 158 in the clockwise direction. A spring or the like may bias the pawl 170 to the position shown in FIG. 6, i.e., with the tab 174 engage with the finger 172. A first end 180 of the cable 156 is attached to the cam plate 158, and a first end 182 of the cable 154 is connected to pawl.

Referring to FIGS. 7A-7D, the pin 190 is rotationally coupled to the seat back 30 such that it rotates in unison with the seatback 30. The pin 190 may be directly connected to the seat back 30 or connected via one or more intermediary member such as a bracket. The pin 190 engages with a first surface 192 of the pawl 170 when the seat back 30 pivots forwardly towards the stowed position. This causes the pawl 170 rotate counterclockwise relative to the cam plate 158, which remains stationary. This rotation of the pawl 170 tensions the cable 154 and causes the headrest 42 to tilt forwardly. Once the pin 190 clears the pawl 170, the pawl 170 returns to the seated position as shown in FIG. 7D.

Figures 8A, 8B, 8C:
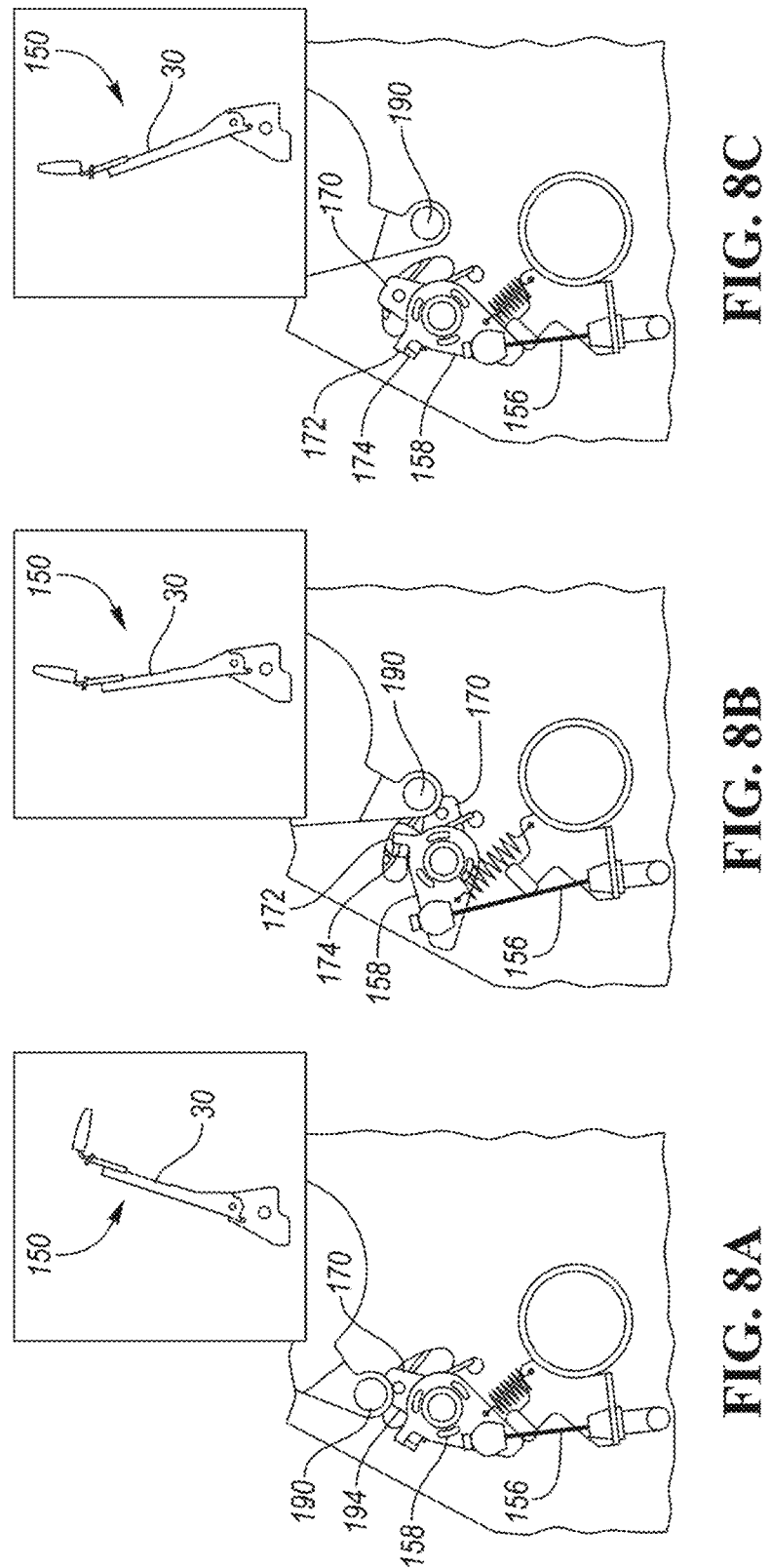
FIGS. 8A-8C illustrate a sequence of the another seat assembly being moved from the stowed position to the in-use position.

Referring to FIGS. 8A-8C, rotation of the seatback 30 back to the upright position causes the pin 192 engage with a second surface 194 of the pawl 170 to rotates the pawl 170 in the clockwise direction. The pawl 170 and the cam 158 are rotational locked due to interaction between the finger and the tab 172, 174. Thus, the cam 158 rotates clockwise as shown in FIG. 8B. Clockwise rotation of the cam 158 tensions the cable 156, which pulls the headrest back to the upright position.

Clause 1. An assembly comprising: a seat bottom; a seat back pivotally attached to the seat bottom; a headrest pivotally attached to the seat back; and a mechanism to pivot the headrest to an upright position responsive to the seat back being pivoted to an in-use position.

Clause 2. The assembly of clause 1, wherein the mechanism comprises a cam rotatably connected to the seat bottom and operably coupled to the headrest, wherein the cam rotates in a first direction relative to the seat bottom responsive to the seat back being pivoted to the in-use position.

Clause 3. The assembly of clause 2 further comprising a cable connected between the headrest and the cam.

Clause 4. The assembly of clause 2, wherein the mechanism comprises a pawl pivotally connected to the cam, wherein the pawl rotates in unison with the cam when the seat back is pivoted to the in-use position.

Clause 5. The assembly of clause 4, wherein the pawl rotates independently of the cam when the seat back is pivoted to a fold-flat position.

Clause 6. The assembly of clause 5, wherein the seat is pivotally connected to the seat bottom by a first fastener and the pawl is pivotally connected to the cam by a second fastener.

Clause 7. The assembly of clauses 4, 5, and/or 6, wherein the cam defines an arcuate slot and the pawl comprises a projection received in the slot.

Clause 8. The assembly of clause 3 further comprising: a pawl rotationally coupled to the cam; and a second cable connected between the headrest and the pawl.

Clause 9. The assembly of any of the above clause 1 further comprising: a first cable connected between the headrest and the mechanism such that the first cable causes the headrest to pivot to the upright position responsive to the seat back being pivoted to the in-use position; and a second cable connected between the headrest and the seat back such that the second cable causes the headrest to pivot to a folded position responsive to the seat back being pivoted to a fold-forward position.

Clause 10. An assembly comprising: a seat bottom; a seat back pivotally attached to the seat bottom, the seat back being pivotal between a fold-forward position and an in-use position; a headrest pivotally attached to the seat back by a tilt mechanism, the headrest being pivotal between a folded position and an upright position via the tilt mechanism, wherein the tilt mechanism pivots the headrest forward to the folded position in response to the seat back being pivoted to the fold-forward position; and a headrest-return mechanism is operably coupled to the seat back and to the headrest, wherein the headrest-return mechanism actuates the headrest such that the headrest is pivoted from the folded position to the upright position in response to the seat back being pivoted from the fold-forward position to the in-use position.

Clause 11. The assembly of any of the above clauses, wherein the headrest-return mechanism is operable to tilt the headrest forward in response to the seat back being pivoted from the in-use position to the fold-forward position.

Clause 12. The assembly of any of the above clauses further comprising a cable connected between the headrest and the mechanism.

Clause 13. The assembly of claim 12, wherein the cable comprises a compensator that provides slack.

Clause 14. The assembly of claim 12, wherein the headrest-return mechanism comprises: a cam connected to the cable and pivotally supported about a pivot axis; and a pawl pivotally attached to the cam, the pawl comprising a first surface and a second surface, wherein the pawl is pivotal relative to the cam when a pin fixed relative to the seat back engages the first surface such that the cable is not tensioned, and the pawl is locked with the cam such that the cable is tensioned when the pin engages the second surface.

Clause 15. The assembly of any of the above clauses, wherein the cam defines a first feature engageable with a second feature of the pawl.

Clause 16. The assembly of any of the above clauses further comprising: a first cable connected to the headrest such that the cable causes the headrest to pivot to the upright position responsive to the seat back being pivoted to the in-use position; and a second cable connected to the headrest such that the second cable causes the headrest to pivot to the folded position responsive to the seat back being pivoted to the fold-forward position.

Clause 17. The assembly of claim 16, wherein the headrest-return mechanism comprises a cam operably coupled to the first and second cables.

Clause 18. The assembly of claim 17, wherein the headrest-return mechanism further comprises a pawl pivotally attached to the cam and attached to the second cable.

Clause 19. The assembly of claim 18, wherein the pawl pivots in unison with the cam in a first direction of rotation and pivots independent of the cam in a second direction of rotation.

Clause 20. An assembly comprising: a cable comprising a first end connectable with a headrest and a second end; a cam connected to the second end and pivotally supported about a pivot axis; and a pawl pivotally attached to the, the pawl comprising a first surface and a second surface, wherein the pawl pivots relative to the cam when a force acts on the first surface such that the cam is not rotated, and the pawl locks with the cam such that the cable is tensioned when a force acts on the second surface.

It is to be understood that any of the above-described clauses may be combine with any, some, or all of the above-described clauses to form additional clauses.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. An assembly comprising:
a seat bottom;
a seat back pivotally attached to the seat bottom;
a headrest pivotally attached to the seat back; and
a mechanism to pivot the headrest to an upright position responsive to the seat back being pivoted to an in-use position.

2. The assembly of claim 1, wherein the mechanism comprises a cam rotatably connected to the seat bottom and operably coupled to the headrest, wherein the cam rotates in a first direction relative to the seat bottom responsive to the seat back being pivoted to the in-use position.

3. The assembly of claim 2 further comprising a cable connected between the headrest and the cam.

4. The assembly of claim 3 further comprising:
a pawl rotationally coupled to the cam; and
a second cable connected between the headrest and the pawl.

5. The assembly of claim 2, wherein the mechanism comprises a pawl pivotally connected to the cam, wherein the pawl rotates in unison with the cam when the seat back is pivoted to the in-use position.

6. The assembly of claim 5, wherein the pawl rotates independently of the cam when the seat back is pivoted to a fold-flat position.

7. The assembly of claim 6, wherein the seat is pivotally connected to the seat bottom by a first fastener and the pawl is pivotally connected to the cam by a second fastener.

8. The assembly of claim 5, wherein the cam defines an arcuate slot and the pawl comprises a projection received in the slot.

9. The assembly of claim 1 further comprising:
a first cable connected between the headrest and the mechanism such that the first cable causes the headrest to pivot to the upright position responsive to the seat back being pivoted to the in-use position; and
a second cable connected between the headrest and the seat back such that the second cable causes the headrest to pivot to a folded position responsive to the seat back being pivoted to a fold-forward position.

10. An assembly comprising:
a seat bottom;
a seat back pivotally attached to the seat bottom, the seat back being pivotal between a fold-forward position and an in-use position;
a headrest pivotally attached to the seat back by a tilt mechanism, the headrest being pivotal between a folded position and an upright position via the tilt mechanism, wherein the tilt mechanism pivots the headrest forward to the folded position in response to the seat back being pivoted to the fold-forward position; and
a headrest-return mechanism is operably coupled to the seat back and to the headrest, wherein the headrest-return mechanism actuates the headrest such that the headrest is pivoted from the folded position to the upright position in response to the seat back being pivoted from the fold-forward position to the in-use position.

11. The assembly of claim 10, wherein the headrest-return mechanism is operable to tilt the headrest forward in response to the seat back being pivoted from the in-use position to the fold-forward position.

12. The assembly of claim 10 further comprising a cable connected between the headrest and the mechanism.

13. The assembly of claim 12, wherein the cable comprises a compensator that provides slack.

14. The assembly of claim 12, wherein the headrest-return mechanism comprises:
a cam connected to the cable and pivotally supported about a pivot axis; and
a pawl pivotally attached to the cam, the pawl comprising a first surface and a second surface, wherein the pawl is pivotal relative to the cam when a pin fixed relative to the seat back engages the first surface such that the cable is not tensioned, and the pawl is locked with the cam such that the cable is tensioned when the pin engages the second surface.

15. The assembly of claim 14, wherein the cam defines a first feature engageable with a second feature of the pawl.

16. The assembly of claim 10 further comprising:
a first cable connected to the headrest such that the cable causes the headrest to pivot to the upright position responsive to the seat back being pivoted to the in-use position; and
a second cable connected to the headrest such that the second cable causes the headrest to pivot to the folded position responsive to the seat back being pivoted to the fold-forward position.

17. The assembly of claim 16, wherein the headrest-return mechanism comprises a cam operably coupled to the first and second cables.

18. The assembly of claim 17, wherein the headrest-return mechanism further comprises a pawl pivotally attached to the cam and attached to the second cable.

19. The assembly of claim 18, wherein the pawl pivots in unison with the cam in a first direction of rotation and pivots independent of the cam in a second direction of rotation.

* * * * *